US008826940B2

United States Patent
Barth et al.

(10) Patent No.: US 8,826,940 B2
(45) Date of Patent: Sep. 9, 2014

(54) HIGH ENERGY DENSITY ELASTIC ACCUMULATOR AND METHOD OF USE THEREOF

(75) Inventors: Eric J. Barth, Nashville, TN (US); Alexander V. Pedchenko, Nolensville, TN (US); Karl Brandt, Ponte Vedra Beach, FL (US); Oliver E. Tan, Anaheim Hills, CA (US)

(73) Assignee: Vanderbilt University, Nashville, TN (US)

( * ) Notice: Subject to any disclaimer, the term of this patent is extended or adjusted under 35 U.S.C. 154(b) by 305 days.

(21) Appl. No.: 13/262,712

(22) PCT Filed: Mar. 31, 2010

(86) PCT No.: PCT/US2010/029361
§ 371 (c)(1),
(2), (4) Date: Dec. 22, 2011

(87) PCT Pub. No.: WO2010/117853
PCT Pub. Date: Oct. 14, 2010

(65) Prior Publication Data
US 2012/0085449 A1 Apr. 12, 2012

Related U.S. Application Data

(60) Provisional application No. 61/167,073, filed on Apr. 6, 2009.

(51) Int. Cl.
*F16L 55/04* (2006.01)
*F15B 1/04* (2006.01)

(52) U.S. Cl.
CPC .......... *F15B 1/04* (2013.01); *F15B 2201/4053* (2013.01); *Y02E 60/15* (2013.01); *F15B 2201/3158* (2013.01); *F15B 2201/22* (2013.01); *F15B 2201/3152* (2013.01); *Y10S 303/11* (2013.01)
USPC ...................................... 138/30; 303/DIG. 11

(58) Field of Classification Search
USPC ............. 92/90; 60/413–415, 639; 138/26, 28, 138/30; 180/165; 123/447; 220/720, 721, 220/723, 530; 303/152, DIG. 10, DIG. 11; 425/DIG. 1; 475/116, 129, 143, 146
See application file for complete search history.

(56) References Cited

U.S. PATENT DOCUMENTS 315,453 A * 4/1885 Waddell ......................... 138/30
2,401,791 A * 6/1946 Overbeke ....................... 138/30
(Continued)

FOREIGN PATENT DOCUMENTS

DE 2551580 A 5/1977
GB 1207594 10/1970
(Continued)

OTHER PUBLICATIONS

Pourmovahed, A., Baum, S.A., Fronczak, F.J., and Beachley, N.H., "Experimental Evaluation of Hydraulic Accumulator Efficiency With and Without Elastomeric Foam". Journal of Propulsion and Power, vol. 4(2), Mar.-Apr. 1988, pp. 185-192.

(Continued)

*Primary Examiner* — Kevin P Shaver
*Assistant Examiner* — Patrick M Buechner
(74) *Attorney, Agent, or Firm* — Wyatt, Tarrant & Combs, LLP (57) ABSTRACT

Disclosed herein is an accumulator which stores energy by deforming from its original shape in response to the flow of a pressurized fluid. The stored energy is returned when the fluid flow is reversed and the accumulator returns to its original shape. At least one feature of the accumulator is that it captures elastic strain energy of a stretched bladder, as opposed to relying on gases and metals for energy storage.

14 Claims, 4 Drawing Sheets

(56) References Cited

U.S. PATENT DOCUMENTS

| | | | |
|---|---|---|---|
| 2,721,580 A | 10/1955 | Greer | |
| 3,148,706 A * | 9/1964 | Mercier | 138/30 |
| 3,162,213 A * | 12/1964 | Peters | 138/30 |
| 3,353,606 A | 11/1967 | Dyer | |
| 3,473,565 A * | 10/1969 | Blendermann | 137/593 |
| 3,632,557 A | 1/1972 | Brode et al. | |
| 3,791,557 A | 2/1974 | Venus, Jr. | |
| 3,797,516 A | 3/1974 | Forster et al. | |
| 3,907,000 A | 9/1975 | Carr | |
| 3,920,047 A | 11/1975 | Mercier | |
| 3,933,172 A | 1/1976 | Allen | |
| 3,946,759 A * | 3/1976 | Mercier | 138/30 |
| 4,162,692 A | 7/1979 | Greer et al. | |
| 4,206,908 A * | 6/1980 | Mercier | 267/64.23 |
| 4,315,562 A | 2/1982 | Tangorra et al. | |
| 4,333,553 A | 6/1982 | Hoppie et al. | |
| 4,364,416 A * | 12/1982 | Jacobellis et al. | 138/30 |
| 4,413,652 A * | 11/1983 | Allewitz | 138/31 |
| 4,427,028 A * | 1/1984 | Jacobellis | 138/30 |
| 4,448,217 A * | 5/1984 | Mercier | 138/30 |
| 4,479,356 A | 10/1984 | Gill | |
| 4,520,840 A | 6/1985 | Michel | |
| 4,533,067 A | 8/1985 | Sansevero, Jr. et al. | |
| 4,651,781 A * | 3/1987 | Kandelman | 138/30 |
| 4,741,155 A | 5/1988 | McCarty | |
| 4,751,155 A | 6/1988 | Binder et al. | |
| 4,793,381 A | 12/1988 | Sugimura | |
| 5,152,455 A | 10/1992 | Palmers | |
| 5,405,409 A * | 4/1995 | Knoth | 623/44 |
| 5,456,787 A | 10/1995 | Myles | |
| 5,511,759 A | 4/1996 | DeKraker et al. | |
| 5,655,569 A * | 8/1997 | Tackett | 138/30 |
| 5,671,884 A * | 9/1997 | Restive | 239/154 |
| 5,682,923 A | 11/1997 | Goloff et al. | |
| 5,709,248 A * | 1/1998 | Goloff | 138/30 |
| 5,755,361 A * | 5/1998 | Restive et al. | 222/209 |
| 5,806,705 A * | 9/1998 | Herald et al. | 220/350 |
| 5,814,064 A | 9/1998 | Daniel et al. | |
| 5,857,618 A | 1/1999 | Restive | |
| 5,938,116 A * | 8/1999 | Restive et al. | 239/1 |
| 5,984,199 A * | 11/1999 | Restive | 239/1 |
| 6,007,582 A | 12/1999 | May | |
| 6,071,460 A * | 6/2000 | Renaudin et al. | 264/314 |
| 6,200,114 B1 | 3/2001 | Brighton et al. | |
| 6,267,147 B1 | 7/2001 | Rago | |
| 6,336,467 B1 | 1/2002 | Schneider | |
| 6,877,965 B2 * | 4/2005 | McCall et al. | 417/472 |
| 7,000,806 B2 * | 2/2006 | Py et al. | 222/386.5 |
| 7,841,432 B2 | 11/2010 | Lynn et al. | |
| 7,913,791 B2 | 3/2011 | Rose et al. | |
| 8,434,524 B2 * | 5/2013 | Barth et al. | 138/30 |
| 2002/0002118 A1 * | 1/2002 | Brandt | 508/378 |
| 2002/0153687 A1 | 10/2002 | Howard | |
| 2005/0096171 A1 | 5/2005 | Brown et al. | |
| 2006/0037658 A1 | 2/2006 | Shimbori et al. | |
| 2007/0126284 A1 | 6/2007 | Swain et al. | |
| 2008/0308168 A1 | 12/2008 | O'Brien, II et al. | |
| 2009/0165451 A1 | 7/2009 | Mueller et al. | |
| 2011/0079140 A1 * | 4/2011 | Baseley | 92/90 |
| 2013/0247751 A1 * | 9/2013 | Baseley et al. | 92/90 |

FOREIGN PATENT DOCUMENTS

| | | |
|---|---|---|
| JP | 4630711 | 9/1971 |
| WO | WO2008045468 A1 | 4/2008 |
| WO | WO2010117853 A1 | 10/2010 |

OTHER PUBLICATIONS

Ashby, M.F., "Materials Selection in Mechanical Design", Pergamon Press, Oxford, 1992, 99. 32-35.

Pourmovahed, A., "Energy Storage Capacity of Gas-Charged hydraulic Accumulators". AIAA Thermophysics, Plasmadynamics and Lasers Conference, Jun. 27-29, 1988, San Antonio, TX pp. 1-11.

Pedchenko A., and Barth E., "Design and Validation of a High Energy Density Elastic Accumulator Using Polyurethane", ASME 2009 Dynamic Systems and Control Conference, Hollywood, California, Oct. 12-14, 2009, vol. 1, pp. 283-290.

* cited by examiner

HIGH ENERGY DENSITY ELASTIC ACCUMULATOR AND METHOD OF USE THEREOF

This is a U.S. national stage application of PCT/US2010/029361 filed Mar. 31, 2010, which claims priority of U.S. Provisional Application No. 61/167,073, filed Apr. 6, 2009, which is hereby incorporated herein by reference.

Be it known that we, Eric J. Barth, a citizen of the United States, residing at 4601 Park Ave., Nashville, Tenn. 37209; Alexander V. Pedchenko, a citizen of the United States, residing at 513 Cedar Brook Lane, Nolensville, Tenn. 37135; Karl Brandt, a citizen of the United States, residing at 846 Shoreline Circle, Ponte Vedra Beach, Fla. 32082; and Oliver E. Tan, a citizen of the United States, residing at 1130 South Tamarisk Drive, Anaheim Hills, Calif. 92807, have invented a new and useful "High Energy Density Elastic Accumulator and Method of Use Thereof."

STATEMENT REGARDING FEDERALLY SPONSORED RESEARCH OR DEVELOPMENT

This invention was made, in part, with federal grant money under the National Science Foundation's Engineering Research Center for Compact and Efficient Fluid Power, grant number 0540834. The United States Government has certain rights in this invention.

REFERENCE TO A MICROFICHE APPENDIX

Not applicable

BACKGROUND OF THE INVENTION

One of the most pressing challenges in the design of an accumulator is the fabrication of a light weight device that may be used in various industries. Hydraulic accumulators are energy storage devices commonly used to provide supplementary fluid power and absorb shock. One particularly interesting recent application of these devices is regenerative braking. Although a theoretically appealing concept, hydraulic regenerative braking (HRB) is difficult to implement due to some major inherent limitations and non-deal properties of conventional accumulators.

Gas bladder accumulators and piston accumulators with a gas pre-charge (PAGPs) use gas for energy storage and, therefore, are much lighter than their spring piston counterparts. In these accumulators, a gas, separated by a bladder or a piston, occupies a certain volume of a container which is otherwise filled with an incompressible fluid. As fluid is forced into this container, the gas inside the separated volume is compressed and energy is stored in the thermal domain (kinetic theory of gasses). Such accumulators are subject to two serious drawbacks: 1) inefficiency due to heat losses, and 2) gas diffusion through the bladder into the hydraulic fluid. The drawback of inefficiency via heat loss is addressable, but the gas diffusion issues gives rise to high maintenance costs associated with "bleeding" the gas out of the fluid often.

With regard to inefficiency, if the energy stored in the compressed gas of such an accumulator is not retrieved soon, the heat flow from the gas to its immediate surrounding results in much less energy being retrieved. It has been shown that with as little as 50 seconds passing between gas compression and expansion, a piston-type gas accumulator's efficiency can fall to about 60%. Pourmovahed, A., Baum, S. A., Fronczak, F. J., and Beachley, N. H., 1988. "Experimental Evaluation of Hydraulic Accumulator Efficiency With and Without Elastomeric Foam". *Journal of Propulsion and Power*, 4(2), March-April, pp. 188. Since a vehicle remains immobile at a stop light for such a length of time or longer, this makes gas bladder and piston accumulators with a gas pre-charge not ideal for HRB applications. Several methods to mitigate these heat losses have been proposed. For piston accumulators with a gas pre-charge, one method involves placing an elastomeric foam into the gas enclosure. This foam serves the purpose of absorbing the generated heat during gas compression that would otherwise be transferred to the walls of the gas enclosure, and ultimately lost. The foam is capable of collecting a large amount of this generated heat and returning it to the gas when the latter expands. According to Pourmovahed, "the insertion of an appropriate amount of elastomeric foam into the gas enclosure . . . [can] virtually eliminate thermal loss". Pourmovahed, A., Baum, S. A., Fronczak, F. J., and Beachley, N. H., 1988. "Experimental Evaluation of Hydraulic Accumulator Efficiency With and Without Elastomeric Foam". *Journal of Propulsion and Power*, 4(2), March-April, pp. 188. Incorporation of elastomeric foam has shown how accumulator efficiency can be improved, however, this modification still does not solve the other problems associated with existing accumulators.

SUMMARY OF INVENTION

The present invention discloses an accumulator for storing hydraulic energy by way of straining a material. The disclosed accumulator may be used to receive a fluid, such as hydraulic fluid, in order to expand the elastic bladder within the accumulator. The accumulator will retain the stored strain energy until the fluid is released so that the elastic bladder returns to the first configuration. In certain embodiments, the accumulator includes a tubular expandable member, such as a bladder, having is constant unstretched diameter, wherein the tubular expandable member has an open end and a closed end, wherein the member has a minimum yield strength of about 1000 psi, wherein the member has a minimum elongation of about 100%, wherein the tubular expandable member is capable of storing a minimum of 20 kJ of strain energy, and a housing surrounding the member so that the expanded member is contained within the housing, wherein the housing limits the radial expansion of the member to a point, of expansion that is less than the maximum unconstrained radial expansion of the member. Other embodiments of the accumulator include a hydraulic fluid source in fluid communication with the tubular expandable member. Another embodiment of the invention is an accumulator including a bladder, wherein the bladder has a first end, wherein the first end defines an opening so that a fluid may enter the bladder to expand it radially and axially, wherein the bladder is an elastomer, a shroud having a first end and a second end, wherein the shroud surrounds the bladder, wherein the shroud limits the radial expansion of the bladder so that the bladder does no stretch to the maximum unconstrained radial expansion of the bladder, wherein the first end of the shroud defines a first opening around the opening in the bladder so that fluid may enter the shroud into the bladder, wherein the shroud defines a second opening so that air may escape the shroud as the bladder fills with fluid and expands within the shroud. Other embodiments of the accumulator include a lubricant on the shroud so that contact between the bladder and the shroud is lubricated. In still other embodiments of the accumulator the bladder is an elastomer such as a polyurethane, or a nitrile rubber. In yet other embodiments of the accumulator, the bladder has a circular cross-sectional shape. Another embodiment of the invention is an accumulator including an expansion member, wherein the expansion member defines an opening for fluid source inlet and outlet, wherein the expansion member has an inner surface and an outer surface, wherein the expansion member is adapted to expand from a first configuration to a second configuration in response to a fluid communication, and then return to the first configuration, a rigid support structure surrounding the expansion member, wherein the rigid support structure, has an inner diameter that is less than the diameter of the outer surface of the expansion member when the expansion member is expanded to a maximum unconstrained radial expansion, a fluid source in fluid communication with the expansion member, and a conduit for providing a fluid connection between the expansion member and the fluid source. In still other embodiments of the accumulator, the expansion member is capable of repetitively expanding. In other embodiments of the accumulator, the inner surface of the expansion member has axial grooves extending the length of the member so that expansion of the member expands the grooves. In yet other embodiments of the accumulator, the thickness of the expansion member is reduced near the opening of the expansion member so that expansion of the member at that position initiates as fluid enters, thereby reducing the sliding of the member on the rigid support structure by promoting a rolling motion. In still another embodiment of the invention, the rigid support structure has a circular cross-sectional shape. In yet another embodiment of the invention, the rigid support structure has a pressure rating of a least 2000 psi. In still another embodiment of the invention, the rigid support structure is vented.

Accordingly, one provision of the invention is to provide an accumulator utilizing strain energy to store hydraulic energy.

Still another provision of the invention is to provide methods for storing energy by use of an expandable accumulator.

Yet another provision of the invention is to provide an accumulator which is compact and lightweight so that it may be used on a passenger vehicle.

PREFERRED EMBODIMENTS OF THE INVENTION

The present invention discloses an elastic accumulator 10 having a tubular expandable bladder 12 that repetitively expands and returns appreciably to its original shape without fatigue. Surrounding the bladder 12 of the accumulator 10 is a housing 14 which limits the radial expansion of the bladder 12 in order to prevent plastic deformation of the bladder 12 resulting from overexpansion. In use, a fluid, such as hydraulic fluid, under pressure enters the bladder 12 and expands the bladder 12 to a point of contact with the housing 14. When it is desirable to retrieve the stored energy, fluid flow is reversed and forcibly ejected, thereby converting strain energy back into hydraulic energy as the bladder 12 reverts to its original shape and configuration.

Figure 1:
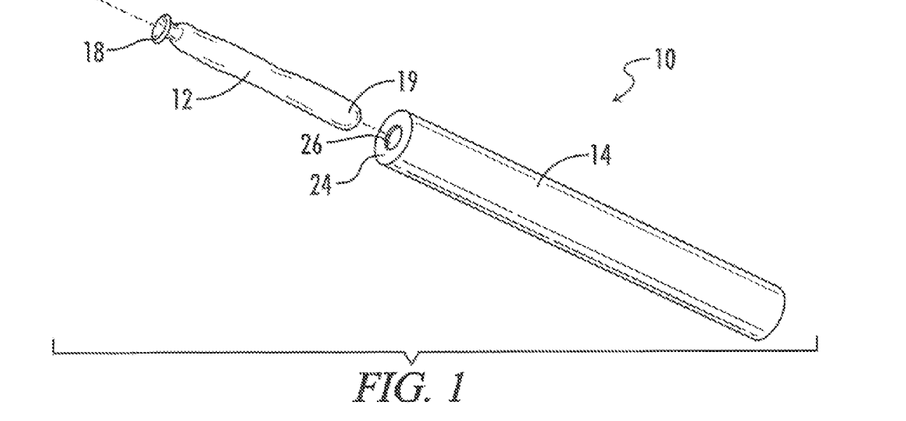
FIG. 1 is a perspective view of an exploded view of an embodiment of the present invention. Shown therein is the tubular expandable bladder which is surrounded by a rigid housing apparatus.

Referring now to FIG. 1, there is shown an exploded view of an embodiment of the present invention. The accumulator 10 includes a tubular expandable bladder 12 within a housing 14. The neck 18 of the bladder 12 is attached to fluid conduit 38 so that the body 22 of the bladder 12 may expand and retract as disclosed herein. The first end 24 of the housing 14 includes an opening 26 which is in alignment with the opening 28 of the bladder 12 that is used for fluid flow. In certain embodiments, the bladder 12 may be inserted into the housing 14 through the opening 26.

Hydraulic Accumulators

By way of background, for a hydraulic accumulator the highest achievable volumetric system energy density can be derived using the following equations:

$$V_{fluid} = \frac{E_{stored}}{P} \quad (1)$$

$$V_{storage\_device} = \frac{E_{stored}}{e_{storage\_device}} \quad (2)$$

Where $V_{fluid}$ is the volume of the fluid used for energy storage, $E_{stored}$ is the amount of energy stored in the system, P is the pressure at which energy storage occurred, $V_{storage\_device}$ is the volume of the energy storage device (where the energy storage device is defined as everything other than pressurized fluid), and $e_{storage\_device}$ is the volumetric energy density of the energy storage device. Using equations (1) and (2) in conjunction with the definition of volumetric energy density we obtain the system volumetric energy density, $e_{system}$:

$$e_{system} = \frac{E_{stored}}{V_{storage\_device} + V_{fluid}} \quad (3)$$

The present invention is a compact, light weight energy storage device. The invention has a low cost of manufacturing and low/no maintenance. In certain embodiments of the present invention, the high energy density accumulator 10 may be used in a fluid powered automotive regenerative braking system (hydraulic hybrid) linked to a hydraulic drive system. Such a high energy density accumulator 10 is appropriate for either series or parallel hydraulic hybrid vehicles. Energy storage of 200 kJ of energy (3500 lbs at 35 mph) at a peak power of 90 kW (35 mph to zero in 4.5 second) is needed in a package of acceptable weight and volume for a compact to midsized passenger vehicle (accumulator system energy density>10 kJ/liter). The present invention aims to remedy the problems of traditional accumulators by (i) reducing fabrication cost, (ii) eliminating the need for maintenance caused by gas diffusion by avoiding the use of a gas pre-charge, and (iii) greatly reducing the loss of energy due to heat transfer to the environment. In part, the problems of traditional accumulators are avoided as the present invention uses an energy storage mechanism not traditionally utilized in existing accumulators.

As background, a conventional braking system uses friction between brake pads and a brake disk to slow a vehicle down. This method results in energy being wasted as heat. In contrast, regenerative braking harnesses the kinetic energy of a vehicle during braking, instead of letting it dissipate in the form of heat. This collected energy can then be used in vehicle acceleration, thereby increasing the fuel efficiency. Hydraulic regenerative braking (HRB), specifically, decelerates wheel rotation by having the wheels pump a fluid into a device which resists this fluid's flow and stores the resulting decrease in the kinetic energy of the vehicle. Although a theoretically appealing concept, hydraulic regenerative braking is difficult to implement due to some major inherent weaknesses of conventional accumulators.

The primary weakness of spring piston accumulators that prohibits them from being used in HRB is their low gravimetric energy density. Using linear analysis, spring steels and titanium alloys have a gravimetric energy density of around 1 to 1.5 kJ/kg. M. F. Ashby, *Materials Selection in Mechanical Design*, Pergamon, Oxford, 1992. Consequently, in order to store enough energy to bring a mid-sized 4-door sedan (mass=3500 lb (1590 kg)) to rest from 35 mph (15.65 m/s), the accumulator spring would have to weigh somewhere from 130 kg to 195 kg. In automotive manufacturing, where minimizing vehicle weight is vital, including such a heavy component would be largely impractical.

Design of the Present Invention

In order to ensure that the design of the present invention is suitable for implementation in HRB for a passenger vehicle, rough performance criteria exist, which include: (i) capable of storing 200 kJ of energy at a peak power of 90 kW; (ii) volumetric energy density of 5 MJ/m³ or above; (iii) gravimetric energy density of 5 kJ/kg or above. The 200 kJ storage capacity requirement was arrived at by using the classical mechanics equation for kinetic energy, equation four ("Eq. (4)"), below, where $E_k$ is kinetic energy in joules ("J"), m is mass in kg and v is velocity in meters per second (m/s).

$$E_k = \tfrac{1}{2} mv^2 \quad (4)$$

An average 4-door sedan has a mass of approximately m=3500 lbs (1590 kg). Working under the simplifying assumption that a vehicle of this weight is a point mass experiencing translational rigid body motion of v=35 mph (56.3 km/h) without rotation (allowing the use of Eq. (4)), $E_k$=194,713 J 200 kJ. This number represents the amount of energy that would be dissipated as heat in traditional braking to stop the vehicle. In HRB, this is the amount of energy that the system should capture, assuming 100% efficiency.

The gravimetric energy density requirement was prescribed to 5 kJ/kg in order to ensure that the accumulator 10 would not significantly augment the vehicle's weight. Under this constraint, an accumulator 10 capable of storing 200 kJ of energy would weigh no more than 40 kg, barring the working fluid. The volumetric energy density restriction was chosen to be similar to the volumetric energy density of titanium alloys. This limit guarantees that the accumulator 10 will not take up more than 0.04 m³, excluding the working fluid.

To see which materials meet the energy density requirements, CES Material Selector version 4.8.0 was used, which is readily commercially available, for example from Granta Design Limited. The CES Material Selector is a software package with an extensive materials and manufacturing processes database; it was employed specifically for its capability to graphically compare user defined material properties. In the initial selection process all material groups were considered. The material volumetric energy density values of certain groups were calculated under the assumption of linear elasticity using Eq. (5), $$u = (\sigma_y^2)/(2E) \quad (5)$$

where u is volumetric energy density of the material in J/m³ $\sigma_y$ is the material's yield stress in Pa and E is the material's elastic modulus in Pa. The material's gravimetric energy densities in J/kg, represented by w, were then calculated by simply dividing a given material's volumetric energy density in J/m³ obtained from Eq. (5), u, by its mass density in kg/m, σ, as shown in Eq. (6).

$$e = u/\rho \quad (6)$$

Several elastomeric materials boast much higher values for both volumetric and gravimetric energy densities than those exhibited by other material families. Of these elastomeric materials, polyurethane and natural rubber not only greatly exceed the specified target metrics for energy densities, but also surpass all other materials in these categories. In fact, polyurethane's gravimetric energy density is about two orders of magnitude higher than that of titanium alloys. Although both rubber and polyurethane appear to be suitable materials for construction of the bladder 12, due to the larger possible maximum values and its commercial availability, polyurethane is a good choice of material for the invention described herein, in certain embodiments. It is important to note here that strain hardening makes the application of linear elasticity to elastomers a practice that should be used cautiously. In order to obtain a far more accurate estimate of energy storage capabilities, a stress-strain curve of the material should be reviewed.

Results from preliminary testing allow the initial prediction of the volume and weight of the full scale accumulator 10, as well as suitable material of construction of the bladder 12. Initial preliminary testing included the use of latex tubing that was capped off at one end and pressurized at the other by using a pump with a pressure gauge. Initially, as air was forced into this cylindrical elastomeric vessel, the increasing pressure caused a very slight increase in volume. When the pressure reached approximately 17 psig (218.6 kPa), the tubing abruptly expanded in a first region. Immediately after this, the pressure dropped to roughly 13 psig (191.0 kPa). As more air was then forced into the latex cylinder, the pressure stayed at this new value while volume continued to increase. That is, the radial expansion continued along axially. This type of expansion behavior is further discussed conceptually below, in relation to the selection of a material of construction for the bladder 12. An accumulator 10 following this type of expansion behavior may have energy stored in the accumulator 10 estimated using Eq. (7).

$$E_{est} = P_{hold}(V_f - V_i) \quad (7)$$

$E_{est}$ is an estimate of stored energy in J, $P_{hold}$ is the constant gauge pressure at which radial expansion propagates in Pa, $V_{init}$ is the initial volume occupied by the accumulator 10 containing the working fluid before it is loaded, and $V_f$ is the maximum volume occupied by the accumulator 10 containing the working fluid at the end of loading in m³.

Using Eq. (7) and letting $E_{est}$ equal 195 kJ, estimates for ($V_f - V_{init}$) were obtained for different $P_{hold}$ values. Additionally, assuming a working fluid of a similar density to hydraulic fluid (taken to be $\sigma_{hyd}$=890 kg/m3), the obtained ($V_f - V_{init}$) estimates were in turn used to obtain change in system mass approximations in kg, $M_{f\ Values\ for\ (Vf - V_{init})}$ and $M_f$ that would result in energy storage of 195 kJ for different values of $P_{hold}$, are shown below. The values are the volume and mass estimates for working fluid.

| $P_{hold}$, psig [kPa] | ($V_f - V_{init}$), ft³ [m³] | $M_f$ lb [kg] |
|---|---|---|
| 3000 [20786] | 0.333 [0.0094] | 18.45 [8.37] |
| 4000 [27680] | 0.250 [0.0071] | 13.93 [6.32] |
| 5000 [34575] | 0.200 [0.0057] | 11.18 [5.07] |

As can be seen above, for the accumulator system capable of functioning with $P_{hold}$ values ranging between 3000 psig and 5000 psig, the working fluid outside of the bladder 12 prior to loading is estimated to weigh between roughly 11 lbs and 19 lbs (5 kg and 9 kg) and occupy between 0.2 ft³ and 0.33 ft³ (0.006 m³ and 0.009 m³). Although these mass and volume values do not account for the initial volume and mass of the bladder, their small magnitudes serve to indicate that an elastomeric accumulator 10 should theoretically be a viable option for HRB application.

Bladder Properties

In order to examine the properties of a first embodiment of a bladder 12 that was constructed, a system 100 was constructed. In an embodiment of the present invention, a bladder 12 was constructed of Andur® 9002 AP, which is a polyurethane commercially available from Anderson Development Company of Adrian, Mich. The bladder 12 is a room temperature curable polyurethane which allows the bladder 12 to be cast using a disposable wax mold that is subsequently melted away from the finished bladder 12. A few mechanical properties of the Andur® material, as specified by the manufacturer, are listed below. The material possesses a high maximum elongation while also maintaining a relatively high elastic modulus, making it a viable material candidate for the accumulator 10.

| Physical property | Imperial Value | Metric Value |
|---|---|---|
| Tensile Strength | 2100 psi | 14.48 MPa |
| Elastic Modulus @ 100% elongation | 790 psi | 5.45 MPa |
| Elastic Modulus @ 300% elongation | 1200 psi | 8.27 MPa |
| Maximum elongation | 600% | |

The following are the dimensions of the bladder 12 constructed of Andur® 9002 AP: 3.5 inches long, and a thickness of from about 1.5 to about 1.8 inches.

Using the equation for energy stored per unit volume, Eq. (8), in conjunction with the polynomial estimating the stress-strain curve allows theoretical volumetric energy density values to be obtained for different extension ratios of the material.

$$u = \int \sigma d\epsilon \quad (8)$$

Figure 10:
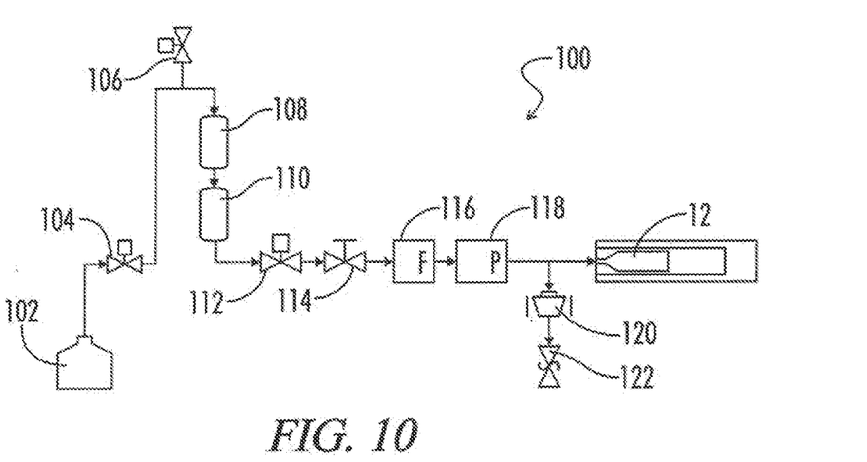
FIG. 10 is a schematic diagram of an embodiment of a system for testing a bladder, as further described herein.

In Eq. (8), $\sigma$ is the stress (Pa), $\epsilon$ is the extension ratio, and $\epsilon f$ is the extension ratio at which the volumetric energy density is to be calculated. For extensions between 400% and 600% ($\epsilon f=4$ and $\epsilon f=6$), this equation predicts bladder 12 to have a volumetric energy density between 25.6 MJ/m³ and 45.0 MJ/m³. Referring now to FIG. 10, there is shown a testing system 100 for the bladder 12 that includes a 125 psig pressure source 102, attached to a first solenoid valve 104, which is attached to a second solenoid valve 106, which is attached to two 2-liter pressure tanks, 108 and 110, respectively. A third solenoid valve 112 is attached to the tanks 108 and 110, the third valve 112 being attached to an orifice valve 114, flow meter 116, pressure sensor 118, safety release valve 120, Schrader valve 122 and the bladder 12. A 125 psig (963 kPa) driving pressure acts to force water into the bladder 12. Initially, a line leading from solenoid valve (SV) 1 104 to the two 2 L pressure tanks, 108 and 110, is detached and the system from the tanks to the bladder 12 are filled with water. To ensure accurate results, the water-filled part of the system is bled of air by using a handheld vacuum pump attached at the Schrader valve 122. Additional water is poured into the tanks, 108 and 110, to make up for the losses resulting from the bleeding process. All SV's are then closed and the line leading from SV 1 104 is reattached to the pressure tanks.

Figure 11:
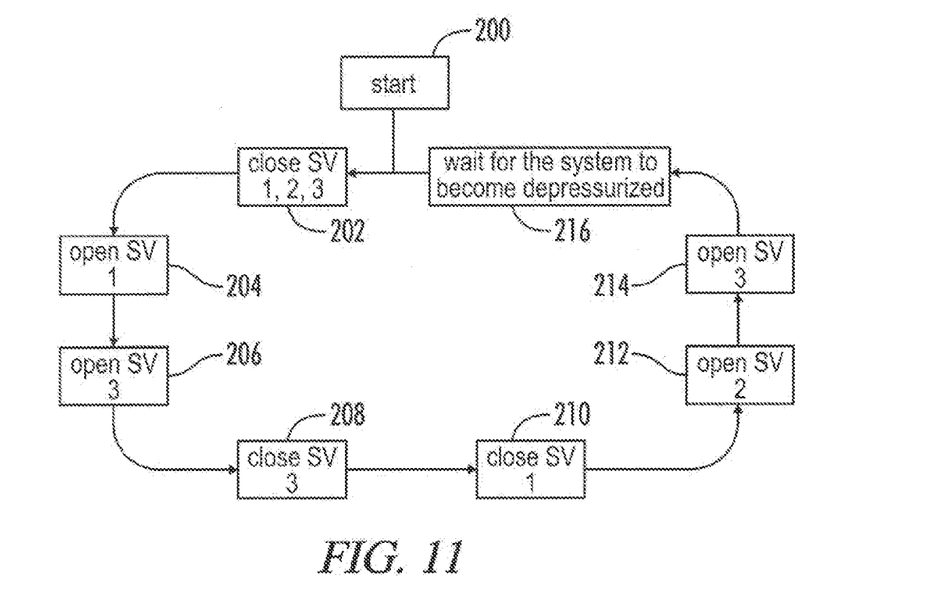
FIG. 11 is a schematic diagram of the steps of the method of operating the system disclosed in FIG. 10.

All valve control and acquisition of sensor data is completed using a computer, as known to one of ordinary skill in the art. The manually adjustable orifice valve 114 is set to a specific position between separate test runs. Incrementally adjusting this valve allows determination of the effect of different rates of loading/unloading on energy storage. Each individual test run is conducted according to the steps of the method shown in FIG. 11. Briefly, the method starts 200, at the position indicated with the steps occurring as follows: (1) close SV 1, 2, and 3, 202, (2) open SV 1, 204, (3) open SV 3, 206, (4) close SV 3 after a period of time ($T_3$) elapses, 208, (5) close SV 1, 210, (6) open SV 2, 212, (7) after prescribed holding time ($T_h$) elapses, open SV 3 to release the working fluid, 214, and (8) wait for a period of time ($T_d$) for the system to become depressurized, 216.

The instantaneous readings from the flow meter (Q) 116 and pressure sensor (P) 118 are integrated as shown in Eq. (9) in order to obtain energy stored in, and retrieved from, the bladder 12, $$E = \int PQ\,dt \tag{9}$$

where $t_0$ is time at which SV 3 112 is opened and $t_f$ is time at which SV 3 112 is closed. When the water is flowing into the bladder 12 E in Eq. (7) represents energy stored ($E_{in}$) and $t_f - t_0 = T_3$. When the water is flowing out of the bladder 12, E in Eq. (7) represents the energy retrieved ($E_{out}$) and $t_f - t_0 = T_d$.

These values are used to calculate the volumetric accumulator energy density ($E_{vo}$) gravimetric accumulator energy density ($E_{go}$) and energy efficiency ($\eta$) of the system. It is important to draw the distinction between the energy density values of the accumulator 10 and those of the accumulator material. The difference is in that the energy densities of the accumulator 10 include the weight and volume of the working fluid in their calculations, whereas the accumulator material energy densities do not. $E_{vo}$ is determined by using Eq. (10), $$E_{vp} = (E_{in})/V_0 + \int Q\,dt \tag{10}$$

where $V_0$ is the original volume of the bladder 12 and the working fluid before the accumulator 10 is pressurized. $E_{go}$ is determined by Eq. (11), $$E_{go} = (E_{in})/m_0 + \int Q\,dt \cdot \sigma_w \tag{11}$$

where $m_0$ is the original mass of the accumulator including the working fluid, before it is pressurized, and $\sigma_w$ is the density of water. Lastly, $\eta$ is determined using Eq. (12).

$$\eta = (E_{out}/E_{in}) \times 100\% \tag{12}$$

In order to determine whether a large number of loading/unloading cycles has a significantly detrimental effect on the energy storage capacity and efficiency of the bladder 12, $E_{voEmo}$ and $\eta$ are measured several times for each position of the manually adjustable orifice valve.

Using the estimates for the volumetric energy density obtained for the previously mentioned extensions and the mass density of a bladder 12 constructed of Andur® 9002 AP ($\sigma_{PU\alpha} \approx 1039$ kg/m3), the volume and mass of a bladder 12 capable of storing 195 kJ was approximated. The bladder 12 was predicted to be manufactured from 0.0043 m$^3$ to 0.0076 m$^3$ of material and to weigh somewhere between 4.50 kg and 7.90 kg, depending on the extension ratio used. Adding these values to the working fluid projections discussed earlier, estimates for the system energy density were made. Approximated parameters are shown below and should be viewed as estimates since their derivation did not include the initial volume of working fluid in the bladder 12 prior to loading (expected to be small relative to the final volume of hydraulic fluid to be stored in the bladder), and other system components such as the equipment necessary for controlling the flow of working fluid. Estimated system energy density (system defined as elastomer material and portion of hydraulic fluid used for energy storage): System Volume (liters): 10.3 (upper bound), 16.6 (lower bound); System Mass (kg): 9.57 (upper bound), 16.27 (lower bound); System Volumetric Energy Density (MJ/m$^3$): 18.93 (upper bound), 11.27 (lower bound); System Gravimetric Energy Density (kJ/kg): 20.38 (upper bound), 11.99 (lower bound).

Figure 12:
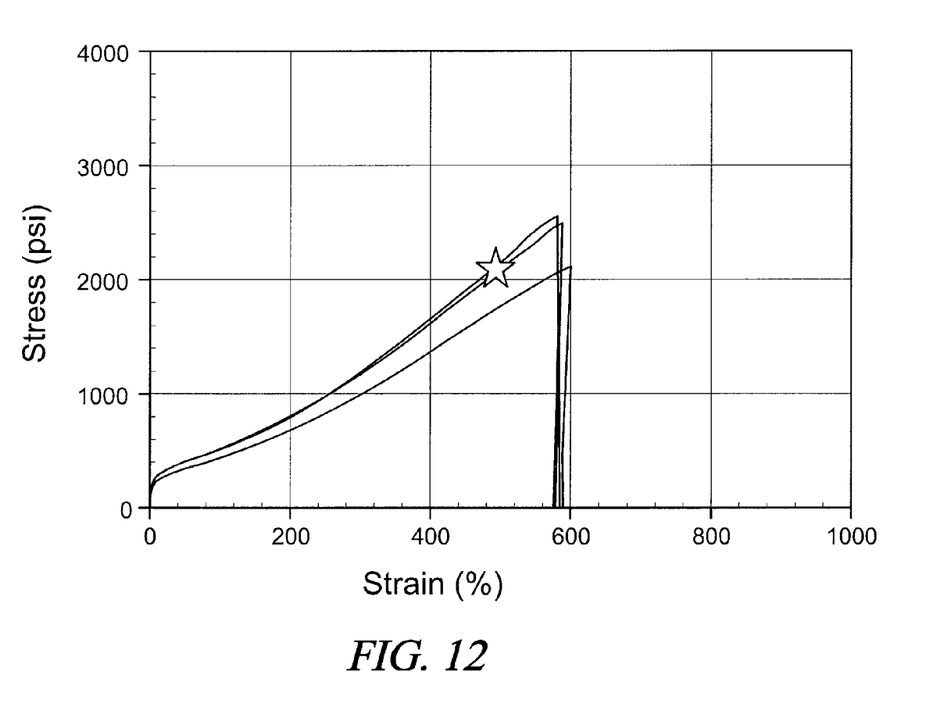
FIG. 12 shows three stress-strain curves for three samples of a material called NBR 6212, as further described herein.

Referring now to FIG. 12, there are shown stress-strain curves for three separate samples of an existing formulation of a nitrile rubber identified as NBR 6212 and manufactured by the Gates Corporation. The stress-strain curves for this material show the useable volumetric strain energy density of the material to be 33 MJ/m$^3$, which is marked by a "star." Provided a bladder manufactured from this material, and capable of storing fluid pressurized to 34.5 MPa, exhibits the same relatively constant pressure volumetric expansion as other hyperelastic materials such as rubber, equation 3 can be used to arrive at a system energy density in the following manner:

To store 200 kJ: Material volume required: 200 kJ/33 MJ/m$^3$=0.0061 m$^3$ (6.1 L)

Fluid volume required: 200 kJ/34.5 MJ/m$^3$=0.00565 m$^3$ (5.65 L)

Total volume required: 0.0061 m$^3$+0.00565 m$^3$=0.01175 m$^3$ (11.75 L)

Ideal volumetric system energy density: 200 kJ/0.01175 m$^3 \approx$ 17 MJ/m$^3$ The ideal volumetric system energy density for an accumulator 10 composed of NBR 6212 is slightly smaller than the stated upper bound on the volumetric system energy.

Embodiments of the Present Invention

Figure 2:
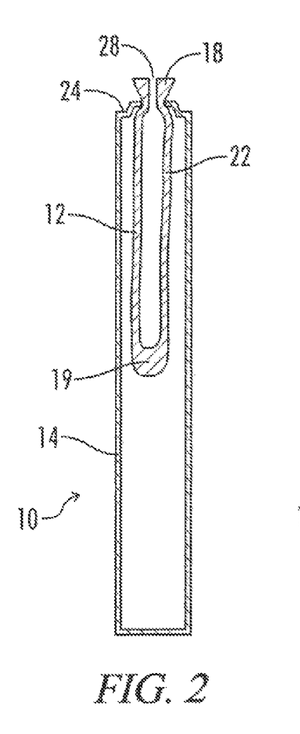
FIG. 2 is a cross-sectional view of an embodiment of the present invention. Shown there is an accumulator having a bladder. The bladder is surrounded by a protective housing. The bladder is empty and is in a non-expanded configuration. Such configuration will change as the bladder fills with pressurized fluid and expands, as shown in FIGS. 3 and 4.
Figure 3:
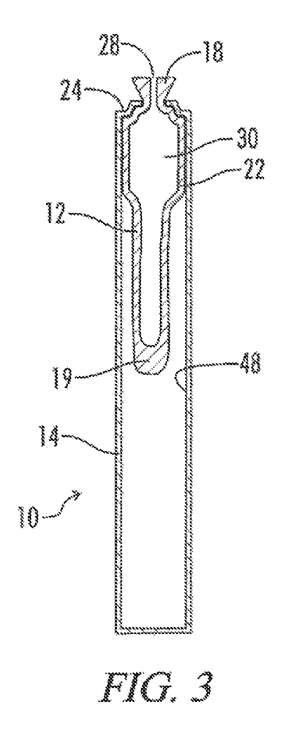
FIG. 3 is a cross-sectional view of the embodiment shown in FIG. 2 after some pressurized fluid is starting to expand the bladder. This figure and FIG. 4 do not show the fluid source nor the fluid conduit which provide the pressurized fluid. Those items are shown in FIG. 7.
Figure 4:
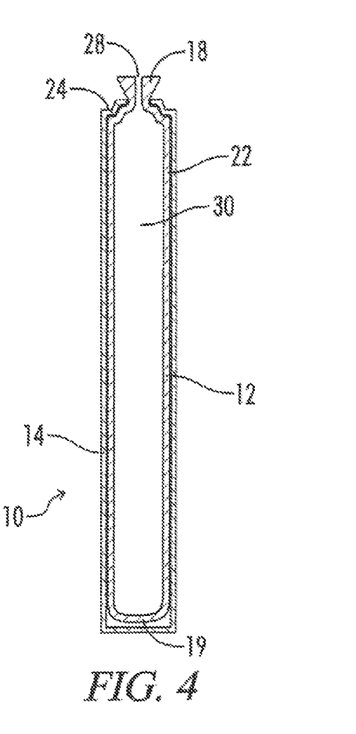
FIG. 4 is a cross-sectional view of the embodiment shown in FIG. 3 after more pressurized fluid expands the bladder. Shown therein is a bladder full of fluid which is fully expanded with the shroud allowing unconstrained axial expansion. The reverse process of the bladder contracting will forcibly eject the fluid under pressure. Also shown is that the protective housing limits the radial expansion of the bladder.
Figure 7:
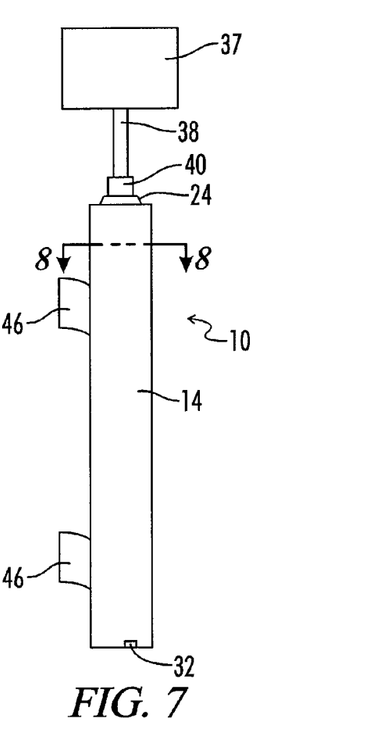
FIG. 7 is a side view of an embodiment of the present invention. Shown therein is a fluid source, such as a hydraulic fluid system of a vehicle, in fluid communication with the accumulator. As hydraulic fluid passes through the fluid conduit into the bladder, which is within the protective shroud, strain energy is stored. The present invention will release its stored strain energy in the form of hydraulic energy if the attached hydraulic system allows fluid to exit the bladder under pressure supplied by the forceful contraction of the bladder. Two brackets attach the shroud to another part of the vehicle (not shown) in order to position the shroud in a stable manner.

Referring now to FIG. 2, there is shown a cross-sectional view of the accumulator 10. Shown in FIGS. 2-4, is a progression of the expansion of the bladder 12 as a fluid 30 is pressured into entering an expanding the bladder 12. Generally, radial expansion of the bladder 12 initiates near the neck 18 of the bladder 12. Radial expansion of the bladder 12 is limited by the housing 14. As shown in the progression of FIGS. 2-4, radial expansion of the bladder 12 extends axially along the bladder 12. The body 22 of the bladder 12 is expanded from its original shape, a first configuration, shown in FIG. 2, to a second configuration, which is storing energy, shown in FIG. 4. In certain embodiments of the present invention, the housing 14 may have a vent 32 through which air may escape the housing 14 while the body 22 of the bladder 12 expands into the second configuration. An embodiment of such a vent 32 is shown in FIG. 7. In certain embodiments, the vent 32 is an adequately sized opening for the purpose stated. The specific location of the vent 32 is not critical. In certain embodiments, a housing 14 may have a plurality of vents 32. In still other embodiments, the vent 32 may include a filtering material, such as GORE-TEX®, so that particles and debris may not enter the housing 14, as damage to the bladder 12 may result.

As used herein, the bladder 12 may also be referred to as an expansion member, or other suitable term which is descriptive of the functions disclosed herein. In certain embodiments, the bladder 12 is constructed of a material capable of performing the functions described herein. In certain embodiments of the invention, the bladder 12 is an elastomer. In other embodiments, the bladder 12 is polyurethane, nitrile rubber, polyisoprene, or natural rubber. Such materials are readily commercially available, such as from Gates Rubber Corporation of Denver, Colo. In certain embodiments of the present invention, the bladder 12 may be constructed of Gates Corporation's NBR 6212 nitrile rubber. In still other embodiments of the present invention, an appropriate energy storing material for the bladder 12 is a material having a high volumetric energy density, a high gravimetric (or mass specific) energy density, and the ability to store the captured energy efficiently for a duration on the order of minutes. In still other embodiments of the present invention, the bladder 12 may be constructed of another known material which is suitable as known to those of ordinary skill in the art. Those of ordinary skill in the art are familiar with the molding and construction techniques that are used to manufacture a bladder 12 having the qualities and characteristics as described herein. Further, those manufacturing services are readily commercially available.

Efficient Energy Storage by the Bladder

As used herein, yield strength has the same meaning as is known to one of ordinary skill in the art. That is, the yield strength of a material is the stress at which the material begins to deform plastically. A minimum yield strength means that the material has a yield strength of at least the given psi. For example, in certain embodiments of the present invention, the bladder 12 has a minimum yield strength of about 1000 psi.

In certain embodiments of the present invention, the material of construction of the bladder 12 is a material exhibiting elastic behavior to strains of at least 1. Stress-strain curves were initially discussed above in this application. Stress-strain curves provide information about the expansion behavior of a material. A number of elastomeric materials display hyperelastic expansion behavior. Such materials are highly desirable for use as a bladder 12 These materials can be fabricated into highly stretchable bladders capable of producing relatively flat pressure-volume curves for a range of fill volumes. That is, as volume increases, pressure remains constant. Another favorable characteristic observed in smaller bladders made of hyperelastic material, and one which is highly desirable in bladder 12, is the absence of statistically significant decreases in energy density and roundtrip efficiency all the way up to failure. Fatigue testing of smaller scale prototypes of bladders 12 show no degradation of performance characteristics up until failure. Building of an initial finite element analysis model use ABAQUS software, which is commercially available under the SIMULIA brand of Dassault Systemes S. A., having offices in Providence, R.I. Accordingly, materials which can be used to create fluid containers having pressure-volume curves that are generally flat are desirable materials for use in the construction of the bladder 12.

As best seen in the FIGS. 1-4, the bladder 12 is housed within the housing 14, and may be a generally cylindrical shape. In still other embodiments of the present invention, the bladder 12 may be a similar shape, such as an oval, octagon, hexagon, or the like, as generally known to those of skill in the art. Accordingly, in certain embodiments of the present invention, the housing 14 may also have such similar shapes.

In certain embodiments of the present invention, the bladder 12 may have a length of from about 30 to about 40 inches. In other embodiments, the length may be from about 31 inches to about 35 inches. In certain embodiments of the present invention, the bladder 12 may have an unexpanded outer surface diameter of about 4 inches and an inner surface diameter of about 2 inches, meaning that the bladder 12 has a thickness of about 1 inch. In other embodiments of the invention, the thickness of the bladder 12 at the closed end 36 has a thickness of about 4 inches.

In certain embodiments of the invention, the proportions of the housing 14, also referred to as a shroud, or rigid support structure, are in relation to the size characteristics of the bladder 12. The housing 14 serves to limit the radial expansion of the bladder 12 to a point of expansion that is less than the maximum unconstrained radial expansion of the bladder 12 Use of a housing 14 has been shown to extend the small scale bladders' fatigue lives by a factor of 4.5 when the housing 14 limits the bladder's 12 maximum outer diameter during expansion to that of about 63% of the outer diameter achieved when expansion is unrestricted. Accordingly, in certain embodiments of the present invention, the housing 14 limits the bladder's 12 maximum outer diameter during expansion to from about 50% to about 70% of the outer diameter achieved when expansion is unrestricted. In yet other embodiments of the present invention, the housing 14 limits the bladder's 12 maximum outer diameter during expansion to from about 60% to about 65% of the outer diameter achieved when expansion is unrestricted. In still other embodiments of the present invention, the housing 14 limits the bladder's 12 maximum outer diameter during expansion to about 63% of the outer diameter achieved when expansion is unrestricted. Further, use of a housing 14 achieves higher holding pressures, a higher energy density, and serves to distribute stress more evenly throughout the bladder 12. Accordingly, in relation to the size characteristics of the bladder 12 disclosed in the paragraph above, in certain embodiments, the housing 14 may have a length of from about 55 inches to about 65 inches. In other embodiments of the present invention, the length of the housing 14 may be about 59 inches to about 63 inches. In certain embodiments of the present invention, the diameter of the housing 14 is about 8.25 inches. In still other embodiments of the present invention, the diameter of the housing 14 may be from about 7 inches to about 9 inches. In still other embodiments of the present invention, the thickness of the housing 14 may be from about 0.12 inches to about 0.14 inches. In yet other embodiments of the invention, the thickness of the housing 14 may be from about one eighth of an inch to about one fourth of an inch. As known of those in the ordinary skill in the art, the thickness of the housing 14 is dependent upon the desired maximum rated pressure for the housing 14. In certain embodiments of the invention, the housing 14 has a pressure rating of at least 2000 psi. As further noted below, those of ordinary skill in the art understand that the dimensions of the present invention may change as the desired energy storage capacity changes.

Still referring to the housing 14, in addition to thickness, the material of construction is relevant. In certain embodiments of the present invention, the material of construction of the housing 14 is a rigid structural material. In certain other embodiments of the present invention, the housing 14 is constructed of steel, carbon fiber, polycarbonate, woven pressure vessel materials, fiberglass, aluminum, or the like. Methods of fabricating a housing 14 of such materials are well known to those of ordinary skill in the art, and such fabrication services are readily commercially available. As known to those of ordinary skill in the art, the invention disclosed herein is scalable to accomplish the magnitude of desired energy storage. Accordingly, while specific dimensions are provided herein, one of ordinary skill in the art is familiar with the modification of those dimensions in order to accomplish specific energy storage characteristics based upon the industry in which the accumulator 10 is applied.

Figure 5:
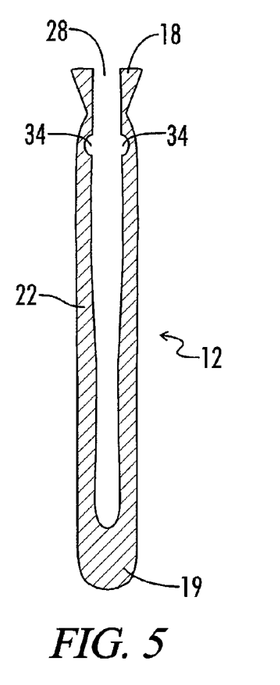
FIG. 5 is a cross-sectional view of an embodiment of the bladder described herein. Shown therein are notches, axisymmetric or otherwise, near the opening of the bladder which reduce the wall thickness of the bladder in order to promote the initiation of radial expansion of the bladder at that location.

Referring now to FIG. 5, there is shown a cross-sectional view from the side of the bladder 12. In the embodiment of the bladder 12 shown, notches 34 are present near the neck 18 of the bladder 12 in order to reduce the thickness of the bladder 12. The thinner wall at that particular location results in an initiation point for the radial expansion of the bladder 12. Accordingly, as best seen in FIGS. 2-4, radial expansion initiates near the neck 18 of the bladder 12 and proceeds axially down the length of the bladder 12. Such expansion reduces the chance of undesirable effects associated with the unpredictable expansion of the bladder 12, such as bending, twisting or jamming. The particular shape of the notches 34, such as oval, or the like, are known to those of skill in the art.

Figure 6:
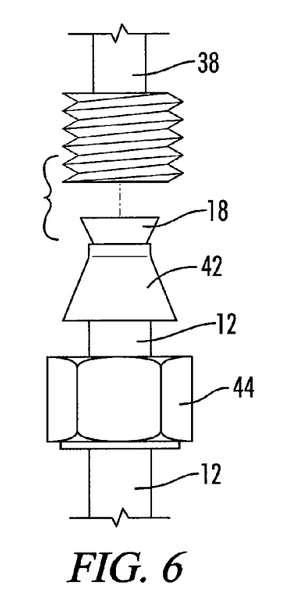
FIG. 6 is a side view of an embodiment of the connection of the bladder to a fluid conduit. Shown therein is the neck of the bladder surrounded by a compression ring and a coupling nut. The neck of the bladder comes in fluid connection with the fluid conduit when the coupling nut fastens to the threaded portion of the fluid conduit.

Referring now to FIG. 6, there is shown an embodiment of the present invention in which the bladder 12 has a neck 18 which extends beyond the housing 14. In certain embodiments of the present invention, the neck 18 may be from about one and one half inches to about three and one half inches in length. FIG. 6 shows the individual parts of the clamp 40 that attaches the neck 18 of the bladder 12 to a fluid conduit 38.

Specifically, there is shown a side view of the coupling nut 44 that slides over the compression ring 42 and threadably engages the threaded element of the fluid conduit 38. Upon rotation of the coupling nut 44, the bladder 12 is in fluid communication with the fluid conduit 38. Other types of clamps resulting in fluid communication are known to those of ordinary skill in the art.

Referring now to the housing 14, neck 18 the housing 14 has an opening 26 which, in certain embodiments, has a diameter of from about 4.25 inches to about 6.25 inches. The opening 26 of the housing 14 is sized to be larger than the opening 28 within the bladder 12. In certain embodiments of the present invention, while the neck 18 of the bladder may contact the opening 26 of the housing 14, the bladder 12 and the housing 14 are not directly connected. The bladder 12 is positioned within the housing 14. The housing 14 is attached to another structural member so that the bladder 12 does not fold, twist, or otherwise experience undesirable strain that would interfere with its function as described herein. In certain embodiments of the present invention, that structural member to which the housing 14 attaches may be a support structure, or the like, which is located near the position of the housing 14 within for example, a vehicle, or other device, in which the accumulator is functioning. In still other embodiments of the present invention, the accumulator 10 may be in use in a vehicle such that the housing 14 is fixedly attached to a structure component of the vehicle which is near. In still other embodiments of the present invention, the housing 14 may be attached to the clamp 40.

Referring now to FIG. 7, there is shown an embodiment of the accumulator 10 which may be in use in a vehicle. The accumulator 10 requires a fluid source 37 in order to operate. The fluid source 37, be it a hydraulic pump or another mechanism capable of providing flow at desirable pressure, will be the energy source which will serve to provide the accumulator 10 with energy via a fluid flow, which the accumulator 10 will store as strain energy. Likewise, the accumulator 10 can return its stored energy by providing a flow at a high pressure to a hydraulic motor or other fluid power device. In a vehicular system, such a fluid source 37 may be hydraulic fluid. In the embodiment shown in FIG. 7, the fluid source 37 provides a source of hydraulic fluid and sufficient pressure to push the hydraulic through the fluid conduit 38 and into the bladder 12 of the accumulator 10. In certain embodiments of the present invention, the bladder 12 is attached to and in fluid communication with the fluid conduit 38. The housing 14 may be attached to a single bracket 46 or a plurality of brackets 46, so that the housing 14 is attached to the vehicle (not shown) through such brackets 46.

Figure 8:
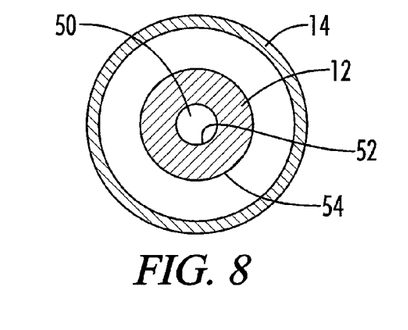
FIG. 8 is a cross-sectional view along the line shown in FIG. 7 of the embodiment of the present invention shown in that figure. Shown therein is the shroud and bladder.
Figure 9:
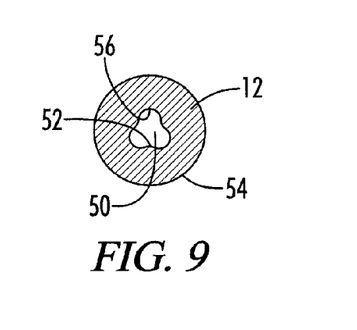
FIG. 9 is a cross-sectional view of an alternate embodiment of the bladder. Rather than having a circular inner surface, as shown for the bladder embodiment of FIG. 8, this alternate embodiment has an inner surface with grooves.

Referring now to FIG. 8, there is shown the thickness of bladder 12. The bladder 12 also has an inner surface 52 and an outer surface 54. The bladder 12 defines a bladder cavity 50. FIG. 8 is a cross-sectional view along the cross-sectional line shown in FIG. 7. In certain embodiments of the present invention, the inner surface 52 of the bladder 12 is circular, as shown in FIG. 8. In alternate embodiments of the present invention, the inner surface 52 of the bladder 12 is not circular, and may have a multi-lobed oval shape, as best seen in FIG. 9. In certain embodiments of the present invention, the inner surface 52 of the bladder 12 has grooves 56 which may assist in the longevity of the bladder 12 as it repetitively expands from a first configuration to a second configuration, and then returns to the first configuration.

All references, publications, and patents disclosed herein are expressly incorporated by reference.

Thus, it is seen that the accumulator of the present invention readily achieve the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention, as defined by the following claims.

What is claimed is:

1. An accumulator, comprising:
   a tubular expandable member having a constant unstretched diameter, wherein the tubular expandable member has an open end and a closed end, wherein the tubular expandable member has a minimum yield strength of about 1000 psi, wherein the tubular expandable member has a minimum elongation of about 100%, wherein the tubular expandable member is capable of storing a minimum of 20 kJ of strain energy;
   a housing surrounding the tubular expandable member so that a fully expanded configuration of the tubular expandable member is contained within the housing, wherein the housing limits the radial expansion of the tubular expandable member to a point of expansion that is less than a maximum unconstrained radial expansion of the tubular expandable member, wherin the housing and the fully expanded configuration of the tubular expandable member define a space between the housing and the closed end of the tubular expandable member.

2. The accumulator of claim 1, further comprising a hydraulic fluid source in fluid communication with the tubular expandable member.

3. An accumulator, comprising:
   a bladder, wherein the bladder has a first end, wherein the first end defines an opening so that as a fluid may enter the bladder to expand it radially and axially, wherein the bladder is an elastomer;
   a shroud having a first end, wherein the shroud surrounds the bladder, wherein the shroud limits the radial expansion of the bladder so that the bladder does not stretch to a maximum unconstrained radial expansion of the bladder, wherein the shroud allows unconstrained axial expansion of the bladder, wherein the first end of the shroud defines a first opening around the opening in the bladder so that fluid may enter the shroud into the bladder;
   wherein the shroud defines a second opening so that air may escape the shroud as the bladder fills with fluid and expands within the shroud.

4. The accumulator of claim 3, further comprising a lubricant on the shroud so that contact between the bladder and the shroud is lubricated.

5. The accumulator of claim 3, wherein the bladder is a polyurethane,

6. The accumulator of claim 3, wherein the bladder is a nitrile rubber.

7. The accumulator of claim 3, wherein the bladder has a circular cross sectional shape.

8. An accumulator, comprising:
   an expansion member, wherein the expansion member defines an opening for fluid source inlet and outlet, wherein the expansion member has an inner surface and an outer surface, wherein the expansion member is adapted to expand from a first configuration to a second, fully expanded, configuration in response to a fluid communication, and then return to the first configuration;
   a rigid support structure surrounding the expansion member, wherein the rigid support structure has an inner diameter that is less than a diameter of the outer surface of the expansion member when it is expanded to a maximum unconstrained radial expansion, wherein the rigid support structure has a length that is more than a length of the second configuration of the expansion member;

a fluid source fluid communication with the expansion member;

a conduit for providing a fluid connection between the expansion member and the fluid source.

9. The accumulator of claim 8, wherein the expansion member is a repetitively expandable material.

10. the accumulator of claim 8, wherein the inner surface of the expansion member has axial grooves extending a length of the member so that. expansion of the member expands the grooves.

11. The accumulator of claim 8, wherein a thickness of the expansion member is reduced near the opening of the expansion member so that expansion of the member at that position initiates as fluid enters the member.

12. The accumulator of claim 8, wherein the rigid support structure has a circular cross sectional shape.

13. The accumulator of claim 8, wherein the rigid support structure has a minimum pressure rating of about 2000 psi.

14. The accumulator of claim 8, wherein the rigid support structure is vented.

* * * * *